INVENTOR.
CARMEN BIBBO
ATTORNEY

June 30, 1959 — C. BIBBO — 2,892,609
COMPOUND-MOVEMENT BUTTERFLY VALVE
Filed July 31, 1956 — 2 Sheets-Sheet 2

INVENTOR.
CARMEN BIBBO
BY
ATTORNEY

United States Patent Office 2,892,609
Patented June 30, 1959

2,892,609

COMPOUND-MOVEMENT BUTTERFLY VALVE

Carmen Bibbo, Parma, Ohio

Application July 31, 1956, Serial No. 601,328

6 Claims. (Cl. 251—163)

(Granted under Title 35, U.S. Code (1952), sec. 266)

The invention described herein may be manufactured and used by or for the Government of the United States of America for governmental purposes without the payment of any royalties thereon or therefor.

This invention relates to valves of the butterfly type, and more particularly to an improved compound-movement butterfly valve.

It is a primary object of my invention to provide a highly efficient, quick and easy acting butterfly valve wherein the valve member or disc is movable in an axial direction toward and from a valve seat, and is rotatable when free from the seat, desirably through 90° between closed and full open positions.

Another object of the invention is to provide a butterfly valve of this character in which the valve member or disc is seated, and is held seated, by the pressure of the fluid directed through the valve.

Other objects of the invention are to provide a butterfly valve of the compound-movement class that is of simple and substantial construction; that is very durable in service, and is highly reliable; that is rugged and will withstand rough treatment and severe shock; that is readily adjustable to any angle between closed and fully open positions for accurately determining the volume of fluid flowing through the valve passage, and that is unaffected by extremely low temperatures ranging downward to −300° F.

Another object of the invention is to provide a butterfly valve of the compound-movement class that is relatively light of weight and compact.

Many compound-movement butterfly valves have heretofore been devised wherein coil springs or springs of other types have been utilized, but the presence of springs in such valves is undesirable, especially when the valves are required to operate at extremely low temperatures. Under such circumstances the springs become stiff and adversely affect the operation of the valves and, in severe cases, become brittle and are liable to break and thus permanently disable the valve.

Furthermore, prior types of compound-movement butterfly valves of which I have knowledge are unduly complicated, bulky, heavy and costly, are likely to get out of order, and are difficult of assembly, disassembly and servicing.

Therefore, a further object of the invention is to provide a compound-movement butterfly valve that is composed of relatively few parts that are especially convenient of assembly and disassembly, thus facilitating inspection and replacement of parts and expediting and cheapening manufacture, and that is devoid of springs.

Another object of my invention is to provide a compound-movement butterfly valve wherein wear of the valve seat is minimized by reason of the manner of co-operation between the seating portion of the valve member or disc and the valve seat, thereby to prolong the life of the seat and preserve the leakproof quality of the valve; and a further and related object is to provide means for adjusting the valve seat to compensate for such wear as may occur.

My invention also comprehends a resilient valve seat and/or seating portion of the valve member or disc.

With the foregoing objects and advantages in view, together with others that will appear as this description proceeds, the invention may be said to consist of the combination and arrangement of parts illustrated in the accompany drawings, and defined by the claims appended hereto, the illustrative embodiment herein disclosed being susceptible to such changes and modifications as are embraced within the scope of the claims.

In the drawings, wherein like reference characters designate like parts throughout the several views, Fig. 1 is a central longitudinal section through my improved compound-movement butterfly valve in a plane at right angles to the axis of the shaft, as indicated by the line 1—1 of Fig. 2;

Figure 1:
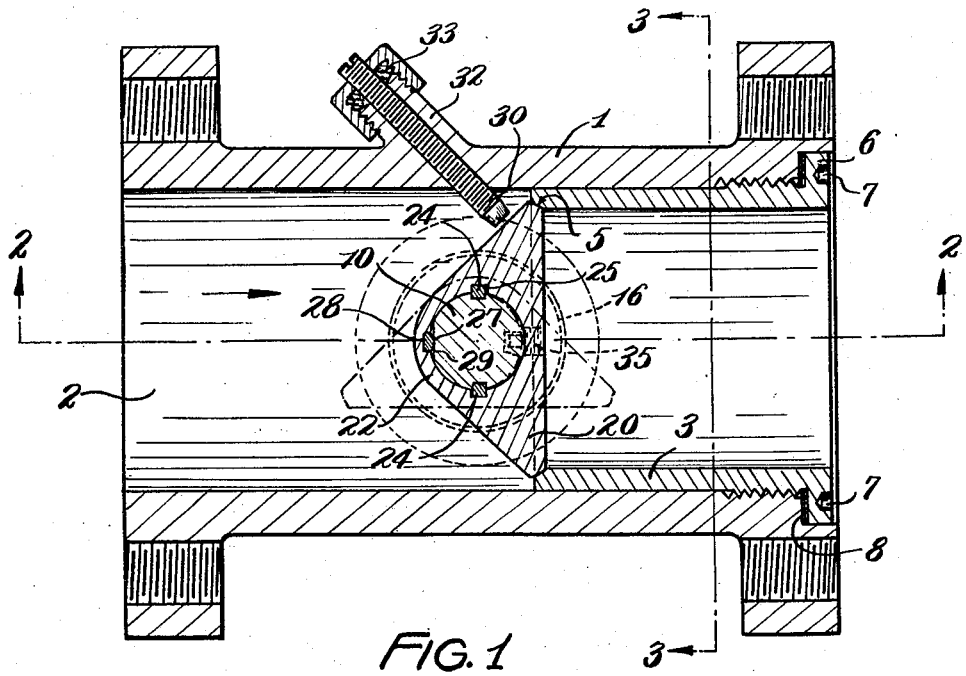

The valve body or casing is designated 1, and it surrounds and defines a flow passage 2, shown as cylindrical throughout its length. The intended direction of flow is indicated by the arrows $a$ in Figs. 1 and 2, and projecting into the outlet end of the body or casing and fitting closely the wall that defines the flow passage is a sleeve 3, the inner end of which, about its inner edge, is chamfered to provide a valve seat 5. The chamfer is desirably at an angle of approximately 25° to the axis of the seat. According to the present preferred construction, the sleeve 3 has an outwardly extending flange 6 surrounding its outer end that occupies a rabbeted circumferential groove of the body or casing, inwardly of which the sleeve has threaded engagement with the casing. The flange 6 is shown as provided with diametrically opposite recesses 7 for the application of a spanner wrench, and one or more shims 8 may be disposed between the inner side of the flange 6 and the opposed wall of the beforementioned groove for properly positioning the valve seat 5 with respect to the valve member or disc. In this manner, the valve seat may be adjusted to compensate for such wear as may occur.

10 denotes the valve operating shaft that is supported for oscillation by and between opposed wall portions of the body or casing 1 diametrically of the passage 2 a suitable distance upstream from the plane of the valve seat 5 with its axis bisecting at right angles the axis of the seat. One end of the shaft, designated 12, is shown as having operative connection with the shaft 13 of a hydromotor M that is fastened to one side of the body or casing, the end of the motor shaft being shown as recessed to receive the portion 12 of the shaft 10, and as being journaled in a bushing 14 that lines a bearing aperture in the casing wall. The opposite end of the shaft 10 is journaled in an aperture of the opposed wall of the casing that is lined by a bushing 15; and the shaft abuts a plug 16 that is screwed into a boss of the casing.

Obviously, the shaft 10 may be mounted in any other suitable manner in the body or casing for oscillation, desirably through 90°; and the shaft may be operated otherwise than by means of a motor.

Figure 4:
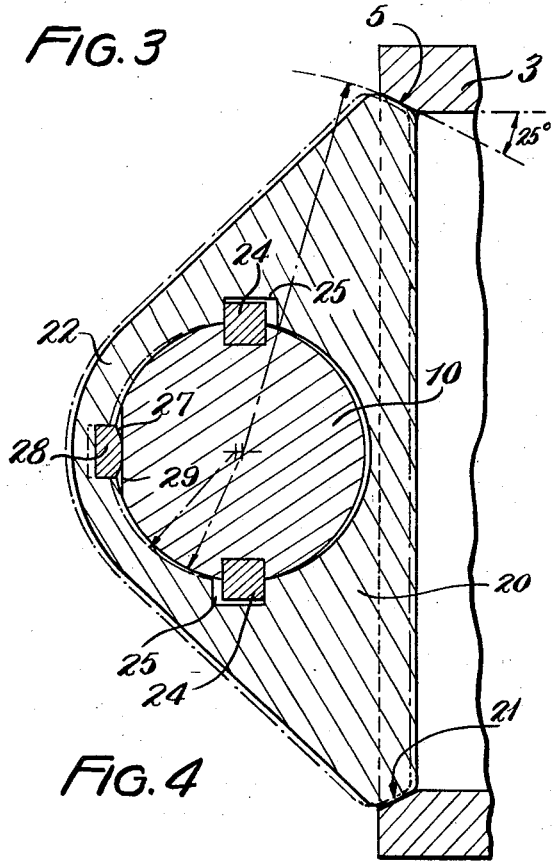
Fig. 4 is a diagrammatic view including the valve seat, the valve member or disc, and the shaft by which the latter is operated and showing the valve in closed position in full lines, and in "cracked" position in broken lines, the latter position resulting from axial movement of the valve member or disc prior to rotation thereof.

20 denotes the valve member or disc that is provided with a seating portion 21 for engagement with the valve seat 5. The seating portion 21 is preferably spherical with its center substantially on the axis of the shaft 10. The valve member or disc 20 incorporates a hub portion 22 that surrounds the shaft 10 and merges along one side into the body portion of said member or disc. The valve member or disc is capable of a slight movement transversely of the shaft and axially of the valve seat, when the valve is approximately in the position shown in full lines in Figs. 1, 2 and 4. Such movement may be provided for by making the bore of the hub portion 22 slightly elliptical with its major axis at right angles to the plane of the seat engaging portion 21, or by making the part of the shaft that occupies said bore slightly elliptical with its major axis substantially parallel to the plane of said seating portion. In the present illustration, the bore is cylindrical and said part of the shaft is elliptical. I may mention at this point that the hub portion 22 of the valve member or disc may be split centrally and longitudinally, if desired, in a plane parallel to the plane of the seat engaging portion 21. In such a modification a substantially semi-cylindrical cap would be constituted of the smaller side of the hub, and this cap would be secured to the larger side by suitable fastening means or screws. Such an expedient is so obvious that detailed illustration is deemed unnecessary.

The valve member or disc 20 is loosely splined to the shaft 10, as by means of keys 24 that are fixed to the shaft and project into overside keyways 25 in the hub portion of the valve member or disc, the keys and keyways being approximately diametrically opposed and in a plane substantially parallel to the plane of the seating portion 21. Midway between the keyways 25, on the side of the valve member or disc remote from the seat engaging portion 21 thereof, the hub portion 22 is provided on its interior with a cam 27. In the present construction the cam is constituted of the convex face of a bar 28 that is fixed in a channel extending throughout the length of the hub portion 22, as clearly shown in Fig. 2. When the valve member or disc is seated and the shaft 10 is in normal position, the cam 27 occupies a longitudinal depression 29 of the shaft. This depression may be complementary to the cam, or, as presently shown, it may consist of a flattened area extending lengthwise of the shaft at least throughout the length of the cam.

A stop 30, desirably adjustable, is supported by the body or casing 1 in a position to arrest movement of the valve member or disc when the latter is rotated toward closing position. The stop preferably consists of a pin that is threaded through a boss 32 of the body or casing. Said boss is shown as equipped at its outer end with a packing gland 33.

To hold the valve member or disc against movement longitudinally of the shaft 10, a set screw 35 is threaded through the circular face of the member or disc and is provided with a smooth projection 36 that occupies a recess in the shaft that is slightly elongated in a direction circumferentially of the shaft to permit of the relative rotation between the shaft and valve member or disc essential to the operation of the valve.

Figure 5:
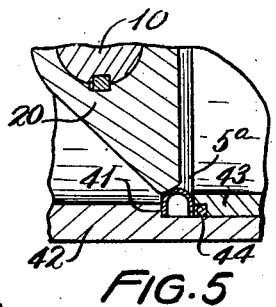
Figs. 5, 6 and 7 are detail views of modifications of the valve seat.
Figure 6:
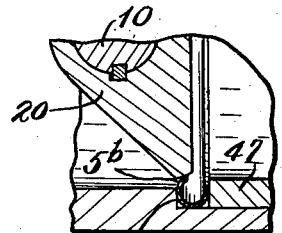
Figure 7:
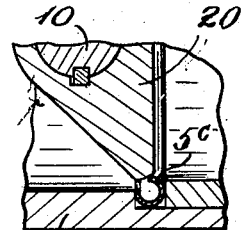

In place of the rigid valve seat 5, constituted of the chamfered inner end of the sleeve 3, I may employ seats that are somewhat resilient, as exemplified by those illustrated in Figs. 5, 6 and 7.

In Fig. 5, an annular valve seat 5ᵃ is constructed of relatively thin, stiff, resilient sheet metal, or other material possessed of substantially the same qualities, and it is in the form of a split tube, or more accurately an outwardly opening channel of U-shape cross section, and is confined between an internal circumferential shoulder 41 of the valve body or casing 42 and the inner end of a sleeve 43 that is projected into the outlet end of the body or casing and is shown as having threaded engagement therewith. Suitable packing 44 seals the joint between the inner end of the sleeve 43 and the seat 5ᵃ.

A resilient valve seat of somewhat different form is illustrated in Fig. 6 where the seat 5ᵇ consists of an annular split tube that is clamped between a shoulder 46 of the valve body or casing and the inner end of a sleeve 47. In this instance, the seating portion of the valve member or disc wipes against the outer side of the seat adjacent one edge thereof.

In Fig. 7, a resilient valve seat 5ᶜ consists of an annular split tube, similar to that shown in Fig. 6, but reversed in its position relative to the valve member so that the seating portion of the latter abuts the edge of the tube whereof the seat is formed.

Figure 8:
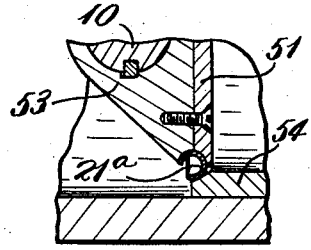
Fig. 8 is a similar view showing a modified form of the seat engaging portion of the valve member or disc.

In Fig. 8 I have shown a resilient seating portion 21ᵃ that is clamped, by a plate 51, to the edge of the valve member or disc 53 and which engages a seat formed by the chamfered inner end of a sleeve 54.

Figure 2:
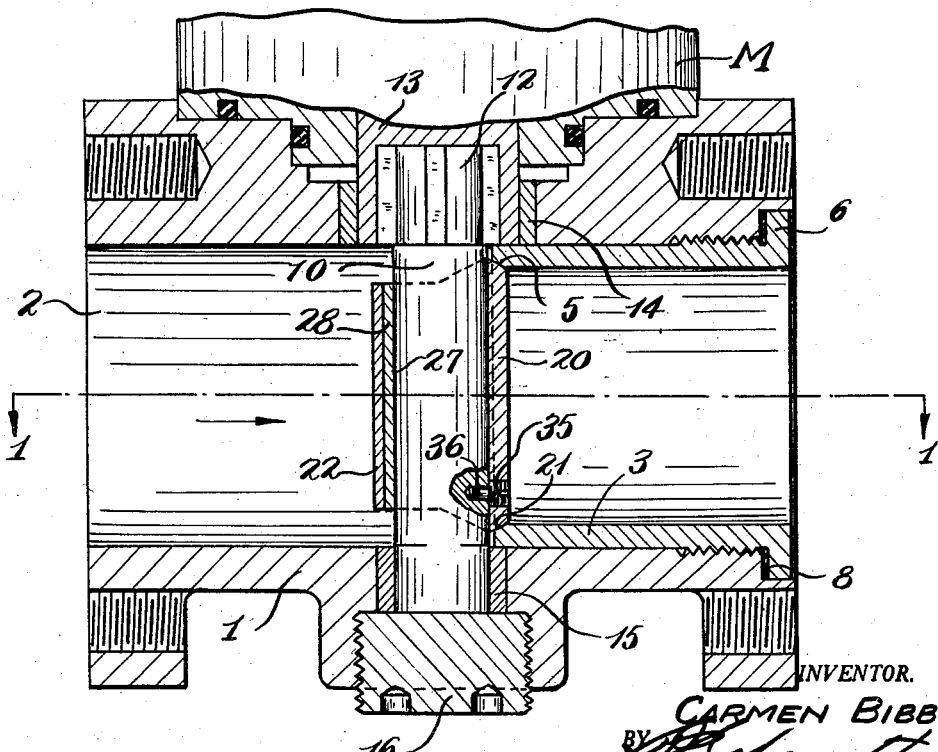
Fig. 2 is a central longitudinal section on the line 2—2 of Fig. 1.
Figure 3:
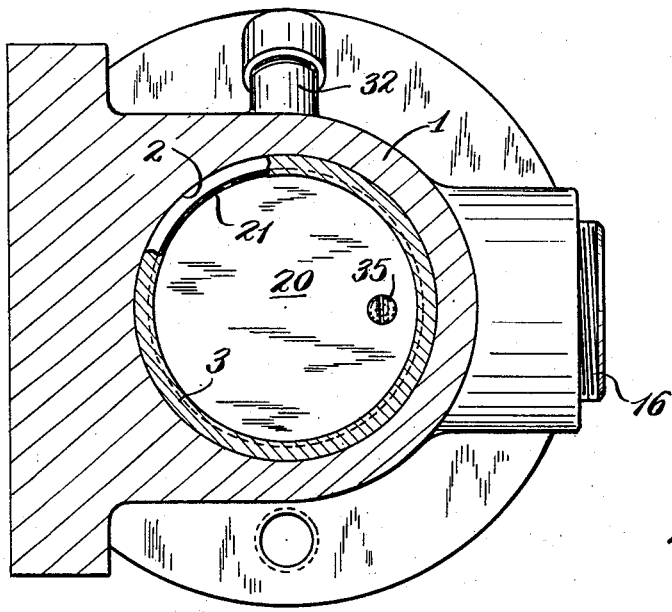
Fig. 3 is a transverse section substantially on the line 3—3 of Fig. 1.

In the operation of the valve, assuming it to be in closed position, slight initial rotation of the shaft in a clockwise direction, as the parts are viewed in Fig. 1, will cause the portion of the shaft along one side of the depression 29 to override the cam 27 and shift the valve member or disc laterally of the shaft so as to withdraw the seating portion 21 from the valve seat 5, thereby to "crack" the valve and relieve the pressure on the upstream side thereof. Now, by continued rotation of the shaft in the same direction, the valve member or disc will be rotated to open position. This may be full open position, as indicated in dotted lines in Fig. 1, or any position intermediate that so indicated and closed position, depending upon the volume of flow desired.

To close the valve, the foregoing operation is reversed. When the valve member or disc 20 engages the stop 30 and the depression 29 of the shaft is centered, so to speak, with respect to the cam 27, the pressure of the fluid against the upstream side of the valve member or disc will seat the valve and hold it tightly closed.

Having thus described my invention, what I claim is:

1. In a butterfly valve of the class described, a casing surrounding and defining a flow passage, a valve seat within the casing about said passage, a valve member having a seating portion for engagement with said seat and supported in the casing for limited free movement axially of the passage toward and from the seat and for forced rotation about an axis substantially normal to that of the seat, and means for withdrawing the valve member from the seat and for rotating said member, in sequence.

2. In a butterfly valve of the class described, a casing surrounding and defining a passage through which fluid is intended to flow in a given direction, a valve seat surrounding the passage and facing upstream, a valve member having a seating portion engaging said valve seat by downstream movement, said valve member being held in contact with the seat by the pressure of fluid upstream from said valve member and supported in the casing upstream from the seat for movement axially of the passage toward and from said seat and for rotation about an axis substantially normal to that of the valve seat, and actuating means having operative connection with the valve member for sequentially withdrawing the member from the seat, for rotating the member to dispose the seating portion thereof in angular relation to the plane of the seat, and for returning the valve member to seating position and releasing it to the action of the fluid so as to be seated.

3. In a butterfly valve of the class described, a casing surrounding and defining a passage through which fluid is intended to flow in a given direction, a valve seat surrounding the passage and facing upstream, a valve member having a seating portion engaging said valve seat by downstream movement, said valve member being held in contact with the seat by the pressure of fluid upstream from said valve member and supported in the casing upstream from the seat for movement axially of the passage toward and from said seat and for rotation about an axis substantially normal to that of the valve seat, and actuating means having operative connection with the valve member for positively withdrawing the valve member from the seat and for rotating the valve member so as to dispose said seating portion in angular relation to the plane of the seat, the valve member being adapted to be rotated in the opposite direction by said means so as to dispose the seating portion thereof in opposed relation to the seat and whereupon the valve member is released to the action of the fluid flowing through the passage.

4. In a butterfly valve of the class described, the combination and arrangement of parts set forth in claim 3, and, in addition thereto, a stop threaded through a part of the casing with its inner end arranged for engagement by the valve member so as to stop oscillation of said member when its seating portion is in a plane substantially parallel to that of the valve seat, the opposite end of the stop being accessible outside the casing to facilitate adjustment of the stop.

5. In a butterfly valve of the class described, a casing surrounding and defining a cylindrical passage through which fluid is intended to flow in a given direction, an annular seat within the casing surrounding said passage and facing upstream, a valve disc having an edge portion disposed in spaced relation to said seat, an annular seat engaging element in the form of a split tube of relatively thin stiff resilient material secured to said edge portion of the disc in contact with the seat, said disc having a limited free movement axially of said passage, and means supporting the valve disc and operable to shift said disc axially of the seat so as to withdraw said seating element from the seat and for turning the disc so as to dispose it in angular relation to the plane of the seat and for returning the valve disc to seating position adjacent said seat engaging element and releasing said disc to the action of the fluid so as to be seated.

6. In a butterfly valve, a casing surrounding and defining a passage through which fluid is intended to flow in a given direction, an annular valve seat within the casing about said passage facing upstream and having chamfered edges converging toward the downwstream end of the casing, a valve member having a seating portion with edges corresponding to the chamfered edges of the valve seat, said seating portion being adapted to engage said valve seat throughout the entire periphery of said seat by downstream movement, said valve member having a bore through which a shaft extends, a bar and a plurality of keys between said shaft and valve member for limited free movement of said member axially of the passage toward and from said seat and for rotating said valve member about an axis substantially normal to that of the valve seat, the valve member being adapted to be rotated so as to dispose the seating portion thereof in opposed relation to the seat, whereupon the valve member is released to the action of the fluid flowing through the passage so as to be seated by the pressure thereof.

References Cited in the file of this patent

UNITED STATES PATENTS

| | | |
|---|---|---|
| 676,526 | Anderson | June 18, 1901 |
| 955,948 | Davis | Apr. 26, 1910 |
| 1,577,900 | Evans | Mar. 23, 1926 |
| 1,669,119 | Bliss | May 8, 1928 |
| 2,059,656 | Ring | Nov. 3, 1936 |
| 2,612,338 | Flosdorf | Sept. 30, 1952 |
| 2,655,942 | Dougherty | Oct. 20, 1953 |
| 2,673,061 | Broz | Mar. 23, 1954 |
| 2,773,510 | Black | Dec. 11, 1956 |

FOREIGN PATENTS

| | | |
|---|---|---|
| 12,241 | Great Britain | Feb. 27, 1905 |
| 605,688 | France | Feb. 20, 1926 |
| 831,862 | France | June 20, 1938 |
| 1,008,139 | France | Feb. 13, 1952 |
| 746,909 | Great Britain | Jan. 6, 1954 |